US008539586B2

(12) United States Patent
Stephenson

(10) Patent No.: US 8,539,586 B2
(45) Date of Patent: Sep. 17, 2013

(54) METHOD FOR EVALUATING SYSTEM RISK

(76) Inventor: Peter R. Stephenson, Auburn Hills, MI (US)

( * ) Notice: Subject to any disclaimer, the term of this patent is extended or adjusted under 35 U.S.C. 154(b) by 1172 days.

(21) Appl. No.: 11/804,397

(22) Filed: May 19, 2007

(65) Prior Publication Data

US 2008/0082380 A1 Apr. 3, 2008

Related U.S. Application Data

(60) Provisional application No. 60/747,707, filed on May 19, 2006.

(51) Int. Cl.
*H04L 29/06* (2006.01)
(52) U.S. Cl.
USPC ................................ 726/25; 726/1; 705/7.28
(58) Field of Classification Search
None
See application file for complete search history.

(56) References Cited

U.S. PATENT DOCUMENTS

| | | | |
|---|---|---|---|
| 7,409,357 B2* | 8/2008 | Schaf et al. | 705/7.28 |
| 7,552,480 B1* | 6/2009 | Voss | 726/25 |
| 7,606,897 B2* | 10/2009 | Izrailevsky et al. | 709/224 |
| 7,756,896 B1* | 7/2010 | Feingold | 707/791 |
| 7,945,940 B2* | 5/2011 | Branzell et al. | 726/1 |
| 2003/0233575 A1* | 12/2003 | Syrjanen et al. | 713/201 |
| 2006/0136327 A1* | 6/2006 | You | 705/38 |
| 2007/0006315 A1* | 1/2007 | Bushnaq | 726/25 |
| 2007/0113281 A1* | 5/2007 | Leach | 726/22 |
| 2009/0106843 A1* | 4/2009 | Kang et al. | 726/25 |
| 2011/0054961 A1* | 3/2011 | DelZoppo et al. | 705/7 |
| 2012/0072247 A1* | 3/2012 | Rosauer et al. | 705/4 |

* cited by examiner

*Primary Examiner* — Michael R Vaughan
(74) *Attorney, Agent, or Firm* — Steven M. McHugh

(57) ABSTRACT

A method for evaluating a system having at least one portal is provided, wherein the method includes examining the at least one portal to identify at least one accessible portal, performing a qualitative analysis responsive to the at least one accessible portal, performing a quantitative analysis responsive to the qualitative analysis and generating a risk profile responsive to the performing a qualitative analysis and the performing a quantitative analysis.

20 Claims, 8 Drawing Sheets

METHOD FOR EVALUATING SYSTEM RISK

CROSS-REFERENCE TO RELATED APPLICATIONS

This present application is related to and claims benefit of U.S. Provisional Patent Application Ser. No. 60/747,707 filed May 19, 2006 entitled "An Improved Process for Information Systems Risk Analysis and Management," which is incorporated by reference herein in its entirety.

FIELD OF THE INVENTION

This invention relates generally to computer information systems and more particularly to a method of risk analysis and management for computer information systems.

BACKGROUND OF THE INVENTION

In networked computer information systems, the potential impact of a security weakness, even if known, tends to be difficult to evaluate and manage in an accurate and timely fashion. One reason for this typically involves the number and nature of these weaknesses, as well as the number of assets involved. For example, an asset may include embedded software layers and other dependencies which may further complicate security assessment and management. Analysis and management difficulties may be still further compounded by services that involve many different assets with interdependencies between those assets.

The ability to identify, understand and make informed decisions based upon a security risk is one important element of effectively managing the security of a network. For example, this ability allows a network manager to ascertain the risks to the network infrastructure and to assign a priority action for each identified risk. Currently, there are several management tools available to help a network manager identify, analyze and manage risks to a computer information system. For example, one such tool allows a network manager to simulate a network/client relationship based on a Service Level Agreement (SLA) profile, wherein the model allows for the presentation of services and customers, their relationship to network objects and the relationships between the network objects in the form of a graphical asset map. Another such tool allows the service-level characteristics to be displayed in a color-coded chart which represents a list of services and corresponding statuses relative to performance, security, systems, applications and networks.

Unfortunately however, these available tools have several undesirable characteristics. One such characteristic involves the inability of the tools to provide a comprehensive view of the security status. Thus, the tool is only able to provide a limited or incomplete view of the security risks. For example, available resources do not provide the capability to model the complex relationships between assets, services and the information system topology in one consolidated representation. This is undesirable because it makes it difficult for a user to quickly relate a service security risk to a related asset. Another such characteristic involves the type and/or level of the information provided. For example, service status information in a service-level view may be limited to a color-coded iconic view or a list item view that represents only one attribute or aggregated attribute, without presenting lower-level details regarding underlying assets that contribute to the security. Moreover, current tools are not able to differentiate between security metrics, thus leading to difficulties in identifying exactly what an indicator is intended to indicate.

Still yet another such undesirable characteristic involves the inability of the current tools to collect, or present information related to the analysis of assets and security weaknesses. Although these tools support vulnerability analysis, they do not take into account asset interdependence. As such, a failure in a database used by a software application may not appear as a failure in the dependent application.

However, despite the availability of an ever increasing number of security event management systems, there are still no currently available solutions which offer the functionality of risk impact consolidation at the network, service and/or organization level. Moreover, in the area of risk calculation, currently available solutions are further deficient in that they are based on various fixed assumptions which typically include, among others, assumptions relating to network topology (mesh, star, etc.), data (modeling, availability, uncertainty, and type such as qualitative or quantitative), organization type (military, government, business, etc.), and variables (threat, vulnerability, asset value, attack paths).

SUMMARY OF THE INVENTION

A method for evaluating a system having at least one portal is provided, wherein the method includes examining the at least one portal to identify at least one accessible portal, performing a qualitative analysis responsive to the at least one accessible portal, performing a quantitative analysis responsive to the qualitative analysis and generating a risk profile responsive to the performing a qualitative analysis and the performing a quantitative analysis.

A method for evaluating a system having at least one portal is provided, wherein the method includes examining the at least one portal to identify at least one accessible portal, analyzing the system responsive to the relationship given by $R=P(T \cdot V \Rightarrow i)$, wherein R is risk, V is vulnerability, T is threat, P is probability and i is the impact on the system and generating a risk profile responsive to the analyzing of the system.

BRIEF DESCRIPTION OF THE DRAWINGS

The foregoing and other features and advantages of the present invention will be more fully understood from the detailed description of illustrative embodiments, taken in conjunction with the following accompanying figures in which like elements are numbered alike.

DETAILED DESCRIPTION

Figure 1:
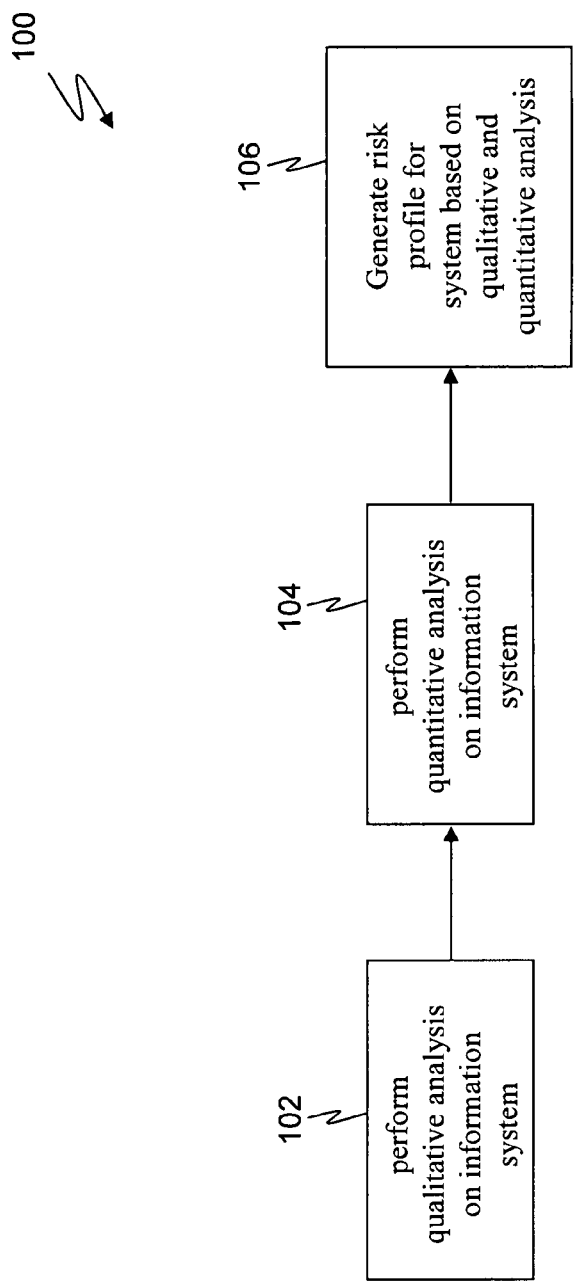
FIG. 1 is a high level block diagram illustrating one embodiment of a method for generating a risk profile for a system, in accordance with the present invention.

In accordance with the present invention, an information systems risk analysis and management method is provided, wherein the method is universal, versatile and easy to implement. The method involves the application of three (3) taxonomies (threat, vulnerability and risk) in the form of an upper level ontology, to the analysis of raw threat and vulnerability data that has been extracted from a networked computing system under evaluation. This analysis, which is also referred to as a qualitative analysis, identifies the risks to a networked computing system on a real time or near real time basis (depending upon the immediacy of the input data) and modifies its results based upon changing input data. Moreover, the method of the present invention allows for the comparison of the risk results obtained during analysis of the networked computing system with similar risks globally to allow for the determination of such analysis metrics as risk probability, comparison to global norms and trend/anticipatory analysis.

Furthermore, the method of the present invention not only allows the risk exposure in financial terms to be determined, but also allows for this determination to be adjusted in real time or on a near real time basis. In addition, the method of the present invention allows a vulnerability analysis and/or a threat analysis to be conducted together or separately because the threat and vulnerability functions are individual standalone module for performing threat analysis and/or vulnerability analysis in real time or on a near real time basis.

As such, the present invention provides a non-asset-based process for information systems risk analysis and management which allows for the real time or near real time updating and analysis of threats, vulnerabilities and/or risks in networked computing systems. The method of the present invention allows for both qualitative and quantitative analysis of information system threats, vulnerabilities and risks using modularized (and separate) threat, vulnerability and/or risk analysis functions, wherein the analysis may be conducted using digital forensic techniques. The method of the present invention provides for the identification of unauthorized inter-domain communication threats not identifiable by other available network intrusion detection methods. The method accepts input data from a variety of sources and normalizes that data to be useful for threat, vulnerability and risk correlation. Furthermore, the method may be extended to non-information system applications and may be used to analyze information system threats, vulnerabilities and risks based upon global norms, updated on an ongoing basis by publicly available global information threat, vulnerability and risk data.

The method may apply well-known knowledge management techniques such as taxonomy and persistent ontology mediation services to provide a clear, consistent and complete analysis of information system threats, vulnerabilities and risks. Additionally, not only does the method of the present invention address rapid changes in applicable information threats and vulnerabilities in a timely manner and at a useable granularity or level of abstraction, but the method provides a direct basis for mapping discovered information threats, vulnerabilities and risks to policies, laws, remediation best practices and regulatory requirements. The method further provides a basis for anticipatory analysis of information systems threats, vulnerabilities and risks and supports a standards-based approach to information system threat, vulnerability and risk analysis.

It should be appreciated that the present invention is based, at least in part, on the Stephenson Phenomenological Definition of Information Risk which may be represented as:

$$R = P(T \cdot V \Rightarrow i).$$

In short, the Stephenson Phenomenological Definition of Information Risk states that Risk (R) is equal to the probability (P) that a threat (T) to a vulnerability (V) will result in an impact (i) to the system under evaluation. This definition may be further extended to calculate the risk probability of an impact, i, for a given port ($R_p$) in a system as follows:

$$R_p = \{P_p | (T_p \cdot V_p \Rightarrow i)\}$$

where $P_p$ is the weighted probability of an attack on a port p in the system, $R_p$ is the risk associated with that port, $T_p$ is the threat to that port and $V_p$ is the vulnerability of that port to the threat $T_p$, wherein the risk probability $R_p$ may be expressed as a number between 0 (zero) and 1. Thus, if the statement $T_p \cdot V_p \Rightarrow i$) evaluates to be TRUE, then $R_p = P_p$. It should be appreciated that this analysis may be conducted on a port by port basis or in a system wide manner.

Figure 2:
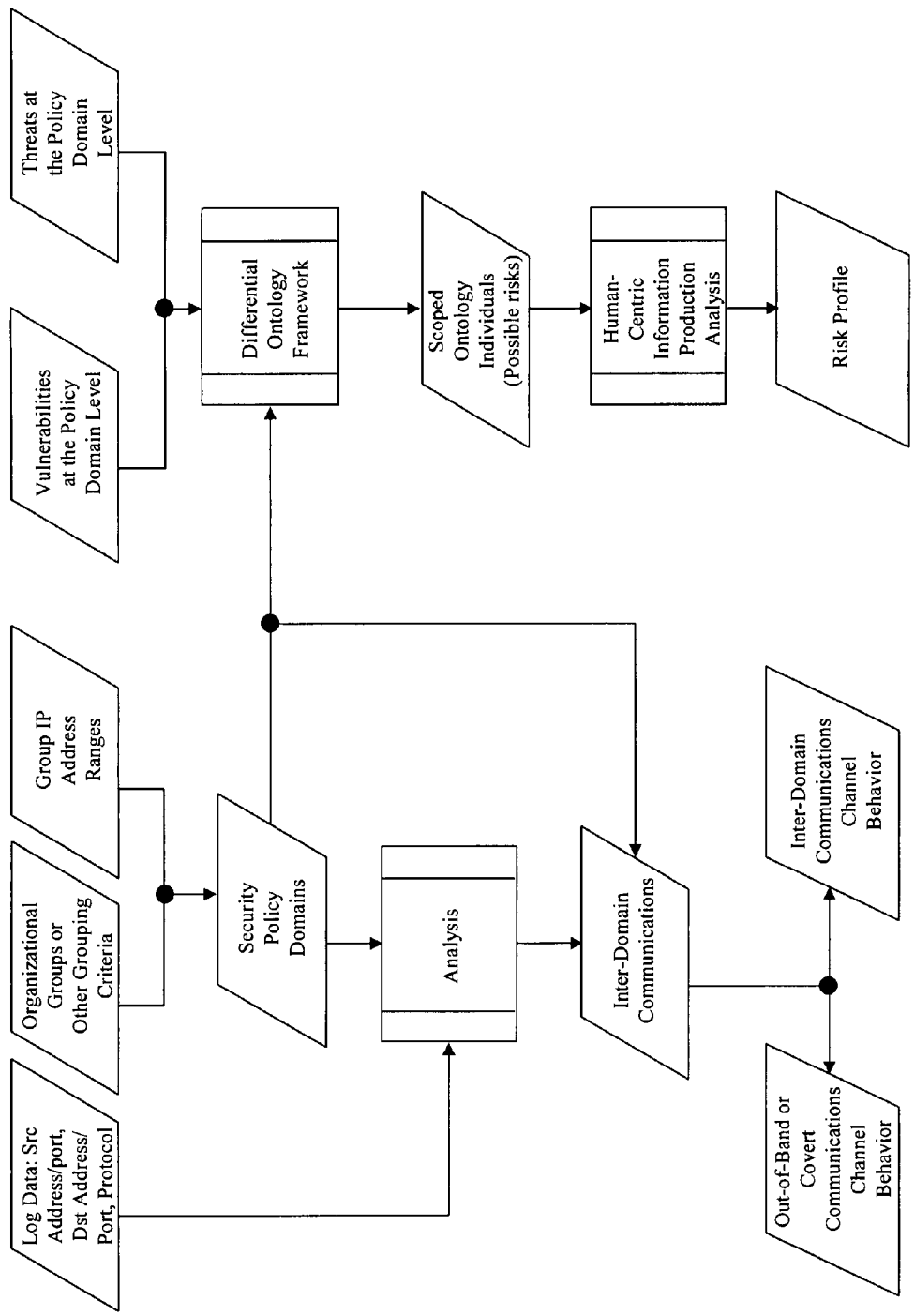
FIG. 2 is a lower level block diagram showing more detail of the method of FIG. 1.
Figure 3:
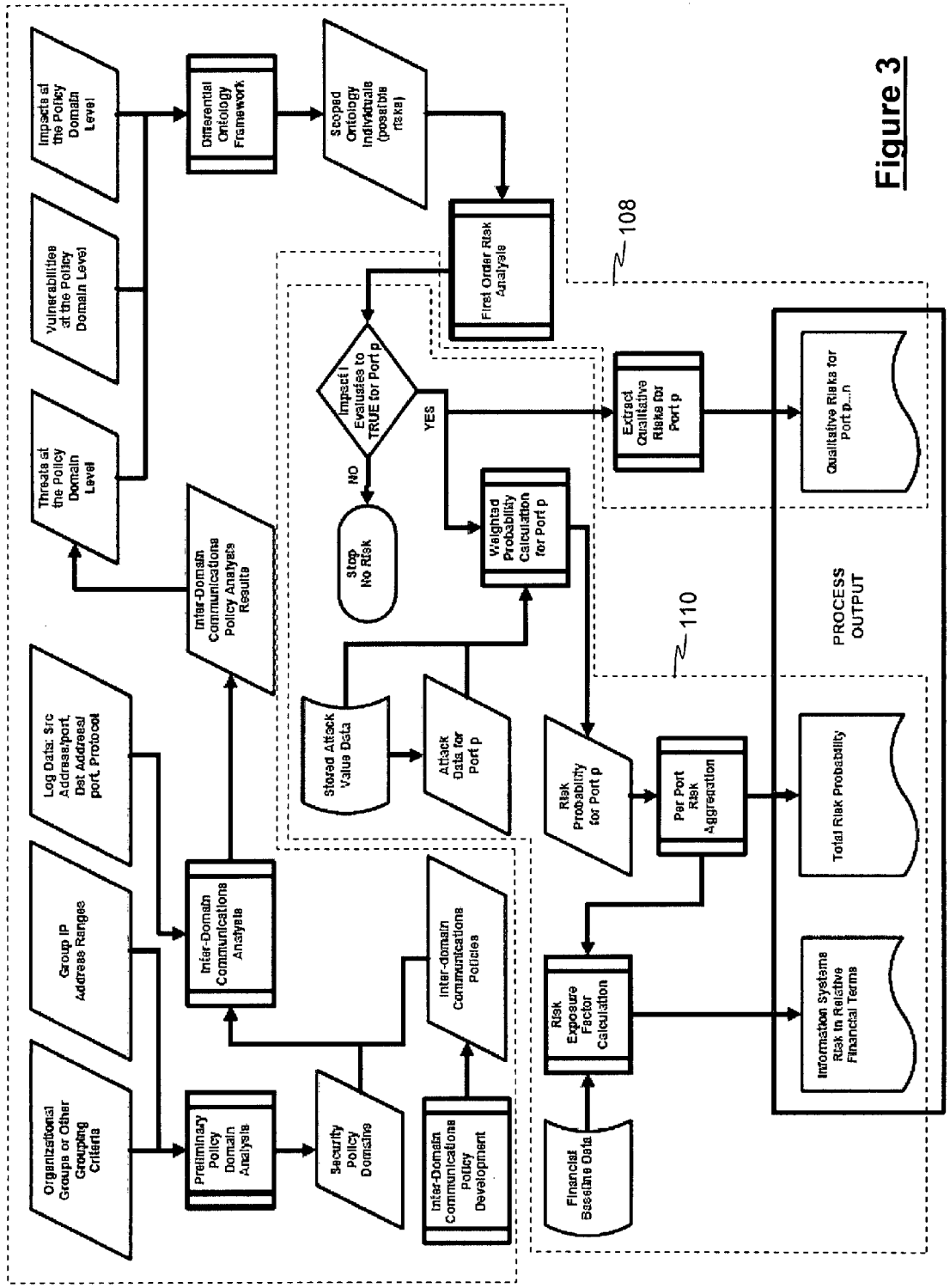
FIG. 3 is a lower level block diagram showing still more detail of the method of FIG. 1, identifying a qualitative analysis phase and a quantitative analysis phase.

Referring to FIG. 1, a block diagram illustrating one embodiment of a method 100 for generating a risk profile for a system is shown, wherein the method 100 includes performing a qualitative analysis of the system, as shown in operational block 102 and as discussed further hereinafter. The method 100 further includes performing a quantitative analysis of the system, as shown in operational block 104 and as discussed further hereinafter, and generating a risk profile of the system based on the results from the qualitative analysis and the quantitative analysis, as shown in operational block 106. Referring to FIG. 2 and FIG. 3, a more detailed level of the overall method 100 is shown and illustrates how the method may be divided into two phases: the qualitative analysis phase 108 and the quantitative analysis phase 110.

Figure 4:
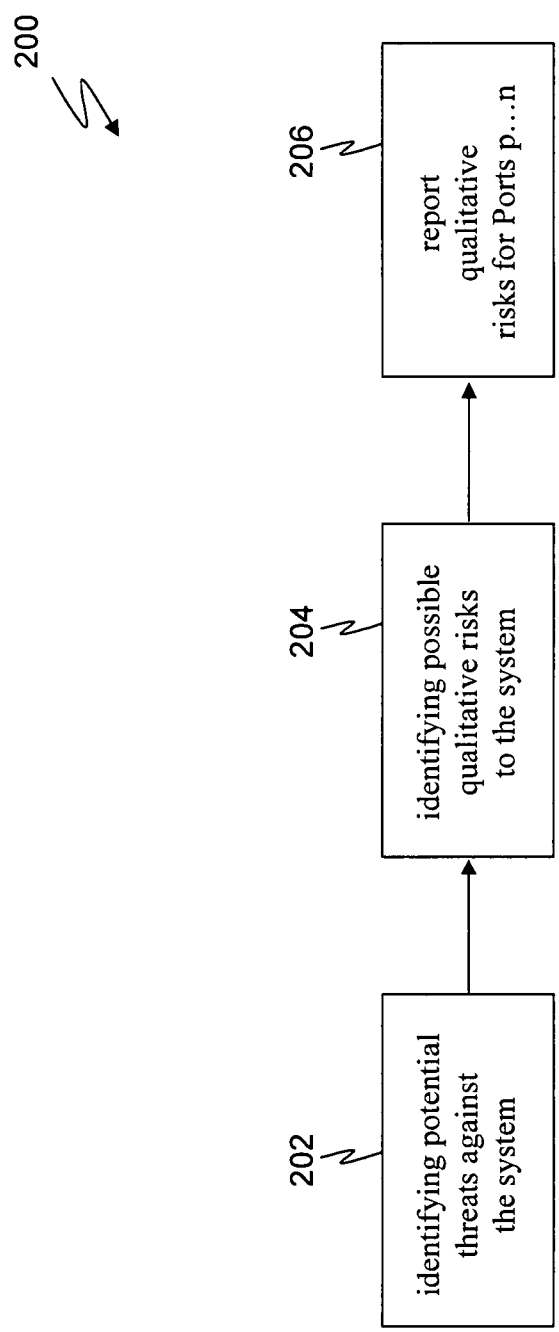
FIG. 4 is a high level block diagram illustrating one embodiment of a method for qualitatively analyzing the risks of a system, in accordance with the present invention.
Figure 5:
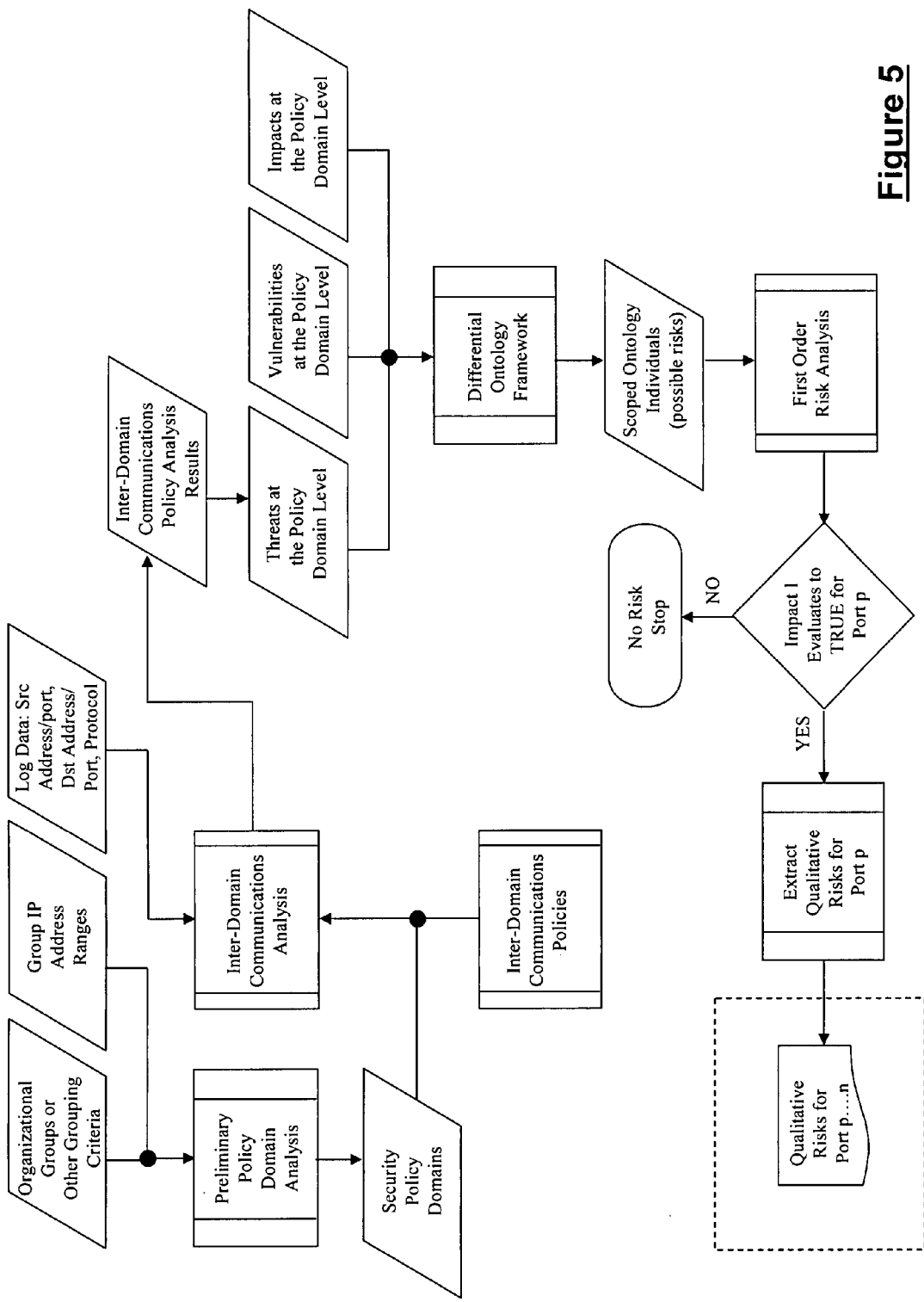
FIG. 5 is a lower level block diagram illustrating one embodiment of a method for qualitatively analyzing the risks of a system, in accordance with the present invention.

Referring to FIG. 4 and FIG. 5, a block diagram illustrating one embodiment of a method 200 for performing the qualitative analysis phase 108 is shown and includes identifying potential threats against the system, as shown in operational block 202. This may be accomplished by performing an inter-domain communications analysis to identify these potential threats. This analysis process may include defining a suitable set of criteria for the organization based on the system, wherein these criteria are analyzed to generate a security policy domain, wherein the policy domain may include all or some of the elements of the system under evaluation that are subject to the same security policy.

In this case, as shown in FIG. 5, the criteria that were used include matching all of the groups that have access to the system with the IP address ranges in the system. Additionally, the analysis process includes developing inter-domain communication policies (or using established policies) which describe the allowed communications between domains and obtaining log data which may include normalized logs from a wide variety of possible sources (e.g. firewall logs, intrusion detection logs, systems logs, etc). The security policy domains, the inter-domain communications policies and the log data are then used to perform the inter-domain communications analysis. The results of this analysis will represent violations of inter-domain communications policies and therefore potential threats against the system.

In accordance with the present invention, the method 200 further includes identifying possible qualitative risks to the system, as shown in operational block 204. This may be accomplished by performing a first order risk analysis which may involve obtaining threat data indicative of (and responsive to) threats to the system at the policy domain level, vulnerability data indicative of (and responsive to) vulnerabilities to the system at the policy domain level and impact data indicative of the impact these threats and vulnerabilities have to the system. It should be appreciated that at least a portion of the threat data is obtained from the inter-domain communications analysis that was performed earlier. This data may then be applied to an ontology reasoner program (i.e. a program that performs an ontological analysis based upon at least one predetermined ontology and/or set of ontologies as determined from the system under evaluation and/or desired results) which applies suitable vulnerability, threat and impact ontologies. It should be appreciated that any ontology reasoner program and/or any vulnerability, threat and/or impact ontology may be used suitable to the desired end purpose.

The results of the ontology reasoner is referred to as scoped ontology individuals and comprises possible risks based upon data processed from the actual organizational files (i.e. threat data, vulnerability data and impact data). These risks may be determined on a port-by-port basis for all or a selected portion of the open ports in the system under evaluation and wherein the results may be expressed at the policy domain level for convenience. As such, each open (in use) port at the analysis point (e.g., the Internet-facing side of a firewall) may have a set of qualitative risks associated with it, wherein each set of risks may be expressed in terms of the combined threat, vulnerability and impact ontologies as may be determined by the ontology reasoner.

It should be appreciated that these scoped ontology individuals (i.e. possible qualitative risks) and the individual threats, vulnerabilities and impacts at the level of the policy domain are then used to perform the first order risk analysis, wherein the first order risk analysis may take the form of:

$$(t \cdot v \Rightarrow i);$$

which essentially means that a threat against a vulnerability typically yields an impact. For example, for i (i.e. impact) to be true, both t (i.e. threat) and v (i.e. vulnerability) need to be true. In other words, a threat without a vulnerability (and vice versa) would yield a result of false (i.e. i=false). If the result of the first order risk analysis is false (t·v⇒ false), then the analysis may be stopped because there is no qualitative risk to the system. However, if the result of the first order risk analysis is true (t·v⇒ true) then the risks identified during the qualitative analysis are identified as qualitative risks for the system (or individual ports, Port P (Port p . . . n) therein).

It should be further appreciated that the qualitative risks may be a combination of normalized Attack Value Factors, threats against the system under evaluation, the inter-domain communications violations within the system and/or the system's vulnerabilities. The qualitative risk profile therefore, typically includes risks identified and presented within the accepted risk taxonomy. As such, the qualitative risk profile may be tied to a normalized cumulative probability "P" for all (or some) attacks (threat over vulnerability pairs) that produce an impact on the networked computing system under analysis. At this point the, qualitative risks for Port P (i.e. Ports p . . . n) may be reported, as shown in operational block 206.

It should be appreciated that if the result of the first order risk analysis is true (t·v⇒ true) then the risks identified during the qualitative analysis are identified as qualitative risks for the system and the quantitative analysis may be conducted.

Figure 6:
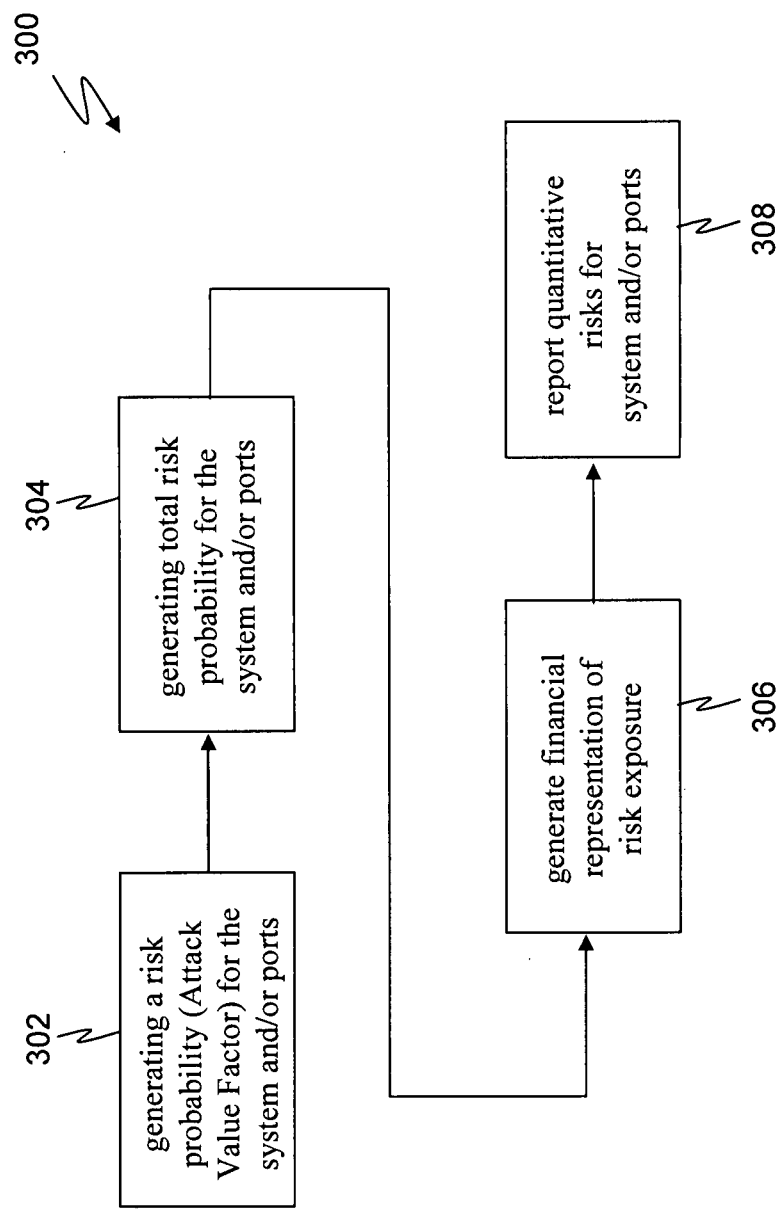
FIG. 6 is a high level block diagram illustrating one embodiment of a method for quantitatively analyzing the risks of a system, in accordance with the present invention.
Figure 7:
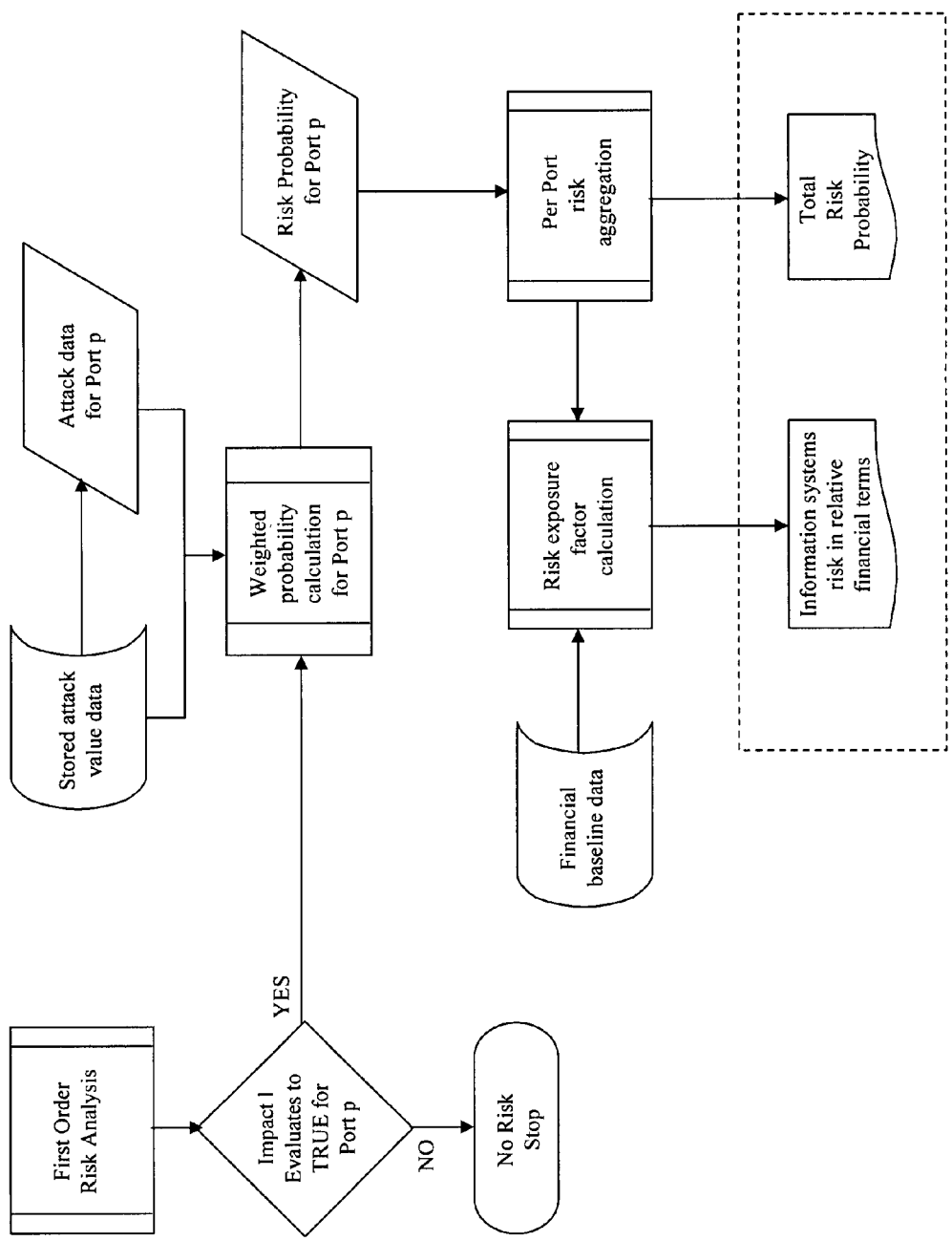
FIG. 7 is a lower level block diagram illustrating one embodiment of a method for quantitatively analyzing the risks of a system, in accordance with the present invention.

Referring to FIG. 6 and FIG. 7, a block diagram illustrating one embodiment of a method 300 for performing the quantitative analysis phase 110 is shown and includes generating a weighted risk probability (i.e. Attack Value Factor) for the system (or individual ports located therein), as shown in operational block 302. This may be accomplished by obtaining attack data related to the system. For example, global attack data for Port p (i.e. Ports p . . . n) may be obtained from a global sensor farm, wherein the global attack data includes data regarding the ports of the system under evaluation. The attack data for the ports of the system under evaluation is then identified from the global attack data. Both the global attack data and the attack data for the identified ports of the system are processed to determine the rank or weighted risk probability for the system (or individual ports located therein).

Figure 8:
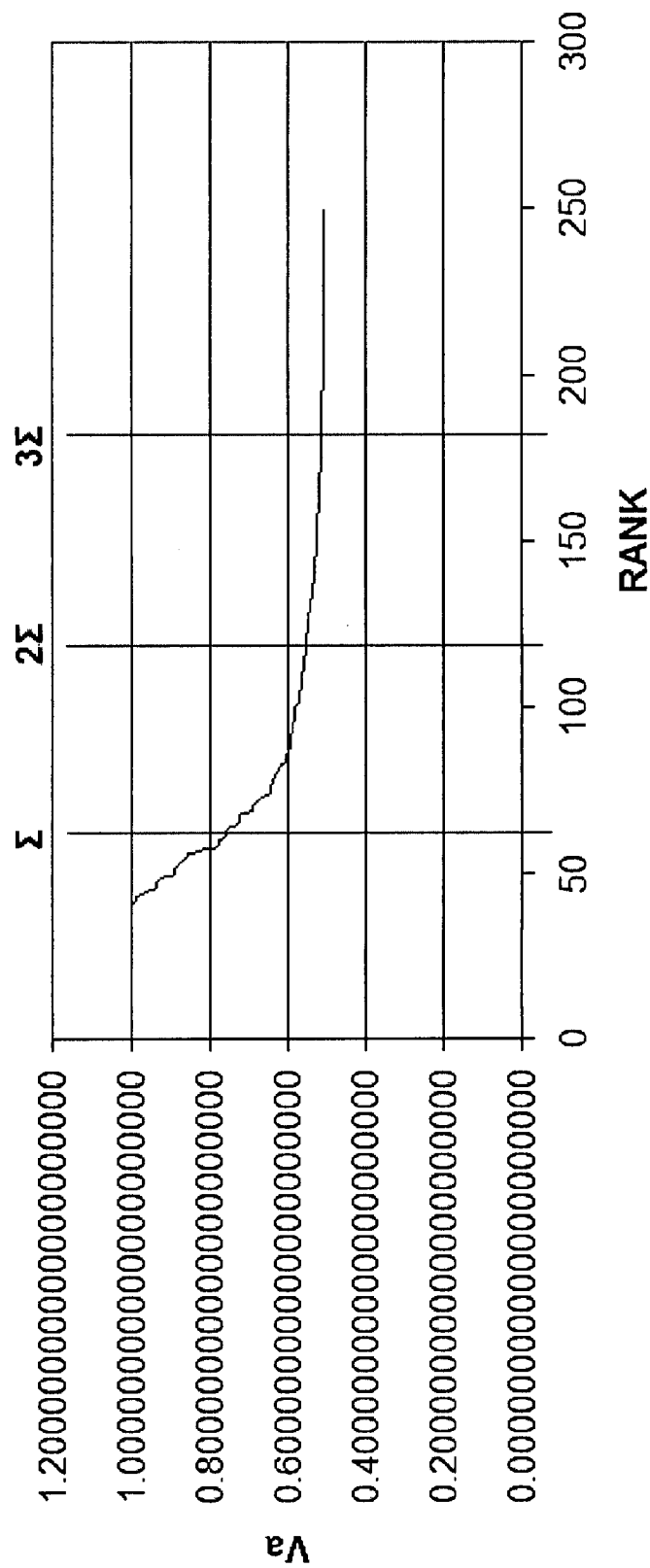
FIG. 8 is one example of a threat curve generated using method of the present invention from over one billion attacks spread globally over the Internet and applied to the top 250 most attacked ports of a system being evaluated.

This may be accomplished by comparing real time data (or near real time) for each of the Port P (i.e. Port p . . . n) with the global attack data for that port(s). It should be appreciated that the comparison between Port p risk from the global data and Port p risk from the real time (or near real time) data evaluated for the system may be based upon relative positions in the port rank as may be calculated from the normal distribution of ranks. This may be illustrated as the threat curve shown in FIG. 8. It should be appreciated that the actual evaluation of the port from the system under evaluation either may be at a higher or lower risk than the same port as evaluated from the global attack data.

The weighted risk probability for the system and/or or individual ports located therein, ("P" from the Stephenson Phenomenological Definition of Information Risk) may be derived using the probability calculation called the Attack Value Factor, $V_a$, which is typically defined as the normal distribution of each destination port (based upon recorded attacks from a global attack sensor farm). The global Attack Value Factor may be calculated for each target port on the system under analysis, wherein a target port may be of interest if an attack against it produces an impact. The Attack Value Factor, $V_a$, for the system under analysis may be calculated using the cumulative attack data against the system on a target port-by-port basis. Thus, associated with any target port in the system under analysis there may be both a local and a global Attack Value Factor.

The method 300 further includes generating a total risk probability, as shown in operational block 304. This may be accomplished by aggregating the weighted risk probability for each of the ports, Port P (Ports p . . . n) under evaluation. Furthermore, the method 300 includes generating a financial representation of risk exposure, as shown in operational block 306, by determining a risk exposure factor using the aggregated risk probability and a standardized set of financial variables as may be determined by the organization. For example, the risk exposure may be given by:

$$R_e = f_q(V_a),$$

wherein $R_e$ is the risk exposure factor, $V_a$ is the Attack Value Factor and $f_q$ is a quantitative analysis factor which is responsive to the financial baseline data of the company or organization. It should be appreciated that the quantitative analysis factor, and hence the financial baseline data, may be different depending on the company or organization whose system is being evaluated. As such, this may vary from entity to entity and may be determined by identifying the information system risks (i.e. what is important to the entity). As such, it is representative of what is important to the bottom line of the entity and what constitutes a legitimate liability to the entity. Thus, the risk exposure factor is a value that, when applied to a financial baseline unique to an entity whose system is under analysis, yields a financial exposure due to the information risk in the system. Thus, the quantitative analysis factor, $f_q$, may be a semi-constant for the entity.

The quantitative analysis factor data may be applied to a calculation that produces a factor that uniquely describes the organization's application of information risk within its own financial modeling. The result of that calculation is applied to the risk exposure factor calculation above. Additionally, the attack value factor and unique financial baseline data for the organization may be applied to that calculation, wherein the output may be responsive to the resulting information risk in financial terms. The total risk probability, the financial representation of risk exposure and/or the qualitative risks for the system (or individual ports, Port P (Port p . . . n) therein) may then be reported, as shown in operational block 308.

It should be appreciated that the method of the present invention may or may not be embodied, in whole or in part, via software, firmware and/or hardware. Additionally, it should be appreciated that the method of the present invention may or may not be embodied, in whole or in part, via instruction using training manuals (i.e. text based materials), seminars, classes, and/or any other media suitable to the desired end purpose. Moreover, It should be appreciated that although the method of the present invention may be implemented, in whole or in part, via software, hardware, firmware and/or any combination thereof, it is also contemplated that the method of the present invention may also be implemented, in whole or in part, without the use of software, hardware, firmware and/or any combination thereof. For example, without the full or partial use of any software, hardware and/or firmware and/or with any combination thereof, but rather via instruction using PC based software and/or classroom instruction with text materials (i.e. books, pamphlets, handouts, tapes, optical media, etc.).

Referring to the examples hereinbefore (which shows two (2) possible embodiments), it should be appreciated that each of the elements of the present invention may be implemented in part, or in whole, as required by the specific scenario developed. Additionally, it is contemplated that each of the elements being implemented may be implemented in any order suitable to the desired end purpose. In accordance with an exemplary embodiment, the processing required to practice the method of the present invention, either in whole or in part, may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing. It should also be appreciated that the embodiments disclosed herein are for illustrative purposes only and include only some of the possible embodiments contemplated by the present invention.

Moreover, the invention may be wholly or partially embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for evaluating vulnerability of a system having at least one port, the method comprising:
    examining the at least one port to identify at least one accessible port;
    performing a qualitative analysis responsive to said at least one accessible port;
    performing a quantitative analysis responsive to said qualitative analysis;
    generating a risk profile responsive to said performing a qualitative analysis and said performing a quantitative analysis, wherein at least one of said examining the at least one port, performing a qualitative analysis, performing a quantitative analysis and generating a risk profile is implemented via a controller; and
    at least one of
        logging said risk profile in a storage device, and
        displaying said risk profile via a display device.

2. The method of claim 1, wherein said performing a qualitative analysis includes,
    identifying potential threats against the system; and
    identifying qualitative risks to the system.

3. The method of claim 2, wherein said identifying potential threats against the system includes performing an inter-domain communications analysis, wherein said inter-domain communications analysis includes,
    defining a set of criteria for the system; and
    analyzing said criteria to generate a security policy domain.

4. The method of claim 3, wherein said security policy domain includes at least a portion of the elements of the system, wherein each of said at least a portion of the elements are subject to the same security policy.

5. The method of claim 2, wherein said identifying qualitative risks to the system includes,
    obtaining system data responsive to threats to the system at a policy domain level, vulnerabilities to the system at said policy domain level and the impact of said threats and said vulnerabilities on the system; and
    generating at least one scoped ontology individual by processing said system data responsive to at least one predetermined ontology, wherein said at least one scoped ontology individual is responsive to at least one possible risk to the system.

6. The method of claim 5, wherein said identifying qualitative risks to the system includes performing a first order risk analysis on said at least one scoped ontology individual.

7. The method of claim 6, wherein said first order risk analysis is responsive to the relationship, $$(T \cdot V \Rightarrow i),$$

where V is the vulnerability of at least one element in the system, T is the threat to said at least one element in the system and i is the impact on the system.

8. The method of claim 7, wherein the result of said first order risk analysis is either true or false.

9. The method of claim 7, wherein if said result is false, the method includes,
determining that no risk to the system is present; and
terminating the system evaluation.

10. The method of claim 1, wherein said quantitative analysis includes,
generating a risk probability for said at least one accessible port;
generating a total risk probability for the system; and
generating a financial representation of the risk exposure of the system.

11. The method of claim 10, wherein said generating a risk probability for said at least one accessible port includes,
obtaining attack data responsive to the system;
identifying attack data for each of said at least one accessible port; and
determining a weighted risk probability for each of said at least one accessible port.

12. The method of claim 11, wherein said generating a total risk probability for the system includes,
aggregating said weighted risk probability for each of said at least one accessible port to generate an aggregated risk probability.

13. The method of claim 10, wherein said generating a financial representation of the risk exposure of the system includes,
determining a risk exposure factor using an aggregated risk probability.

14. The method of claim 13, wherein said generating a financial representation of the risk exposure of the system further includes,
determining a risk exposure factor using a predetermined set of variables responsive to the system.

15. The method of claim 1, wherein said performing a quantitative analysis responsive to said qualitative analysis includes,
generating a risk exposure factor responsive to the relationship, $$R_e = f_q(V_a),$$

wherein $R_e$ is said risk exposure factor, $V_a$ is an Attack Value Factor and $f_q$ is a quantitative analysis factor which is responsive to the financial baseline data of the system.

16. A method for evaluating vulnerability of a system having at least one port, the method comprising:
examining the at least one port to identify at least one accessible port;
analyzing the system to determine a probability that a threat to the system will result in an impact to the system responsive to the relationship given by:

$$R = P(T \cdot V \Rightarrow i),$$

wherein R is risk, V is vulnerability, T is threat, P is probability and i is the impact on the system;
generating a risk profile responsive to said analyzing the system, wherein at least one of said examining the at least one port, analyzing the system and generating a risk profile is implemented via a controller; and
at least one of
logging said risk profile in a storage device, and
displaying said risk profile via a display device.

17. The method of claim 16, wherein analyzing the system includes performing a qualitative analysis responsive to said at least one accessible port, said qualitative analysis including identifying potential threats against the system comprising,
defining a set of criteria for the system; and
analyzing said criteria to generate a security policy domain, wherein said security policy domain includes at least a portion of the elements of the system, wherein each of said at least a portion of the elements are subject to the same security policy.

18. The method of claim 16, wherein analyzing the system includes performing a qualitative analysis responsive to said at least one accessible port, said qualitative analysis including identifying qualitative risks to the system comprising,
obtaining system data responsive to threats to the system at a policy domain level, vulnerabilities to the system at said policy domain level and the impact of said threats and said vulnerabilities on the system;
generating at least one scoped ontology individual by processing said system data responsive to at least one predetermined ontology, wherein said at least one scoped ontology individual is responsive to at least one possible risk to the system; and
performing a first order risk analysis on said at least one scoped ontology individual, said first order risk analysis being responsive to the relationship, $$(T \cdot V \Rightarrow i),$$

where V is the vulnerability of at least one element in the system, T is the threat to said at least one element in the system and i is the impact on the system.

19. The method of claim 16, wherein analyzing the system includes, performing a quantitative analysis, said quantitative analysis including, generating a risk probability for said at least one accessible port,
generating a total risk probability for the system; and
generating a financial representation of the risk exposure of the system,
wherein said generating a risk probability for said at least one accessible port includes,
obtaining attack data responsive to the system;
identifying attack data for each of said at least one accessible port; and
determining a weighted risk probability for each of said at least one accessible port.

20. The method of claim 19, wherein said generating a total risk probability for the system includes,
aggregating said weighted risk probability for each of said at least one accessible port to generate an aggregated risk probability.

* * * * *